(No Model.)
T. F. LONG.
PATCH FOR PRESSURE PIPES.
No. 564,251. Patented July 21, 1896.
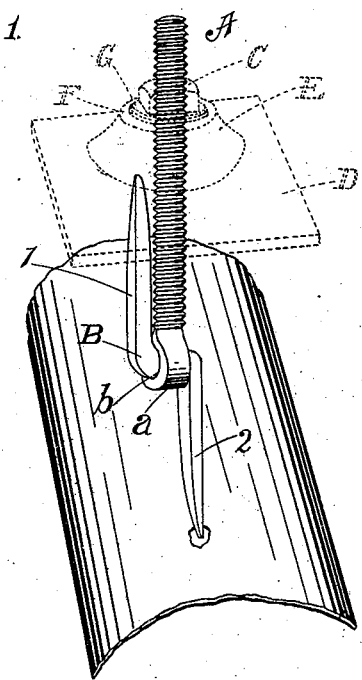
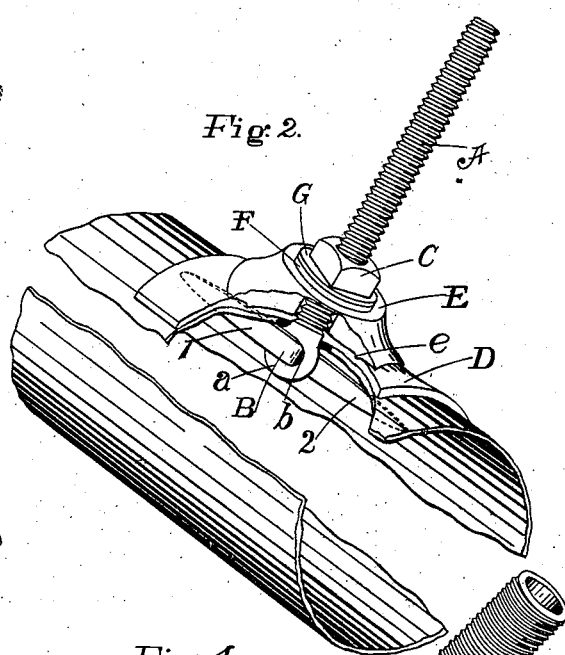
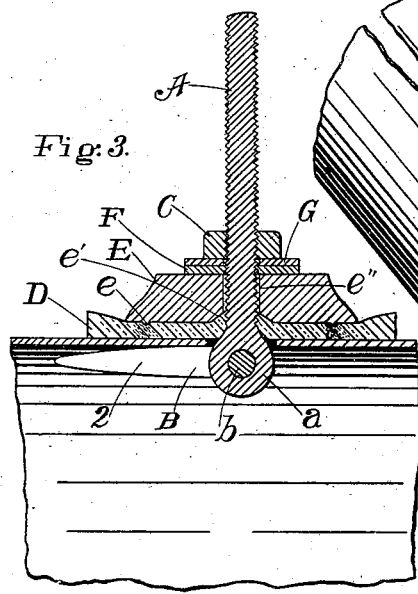
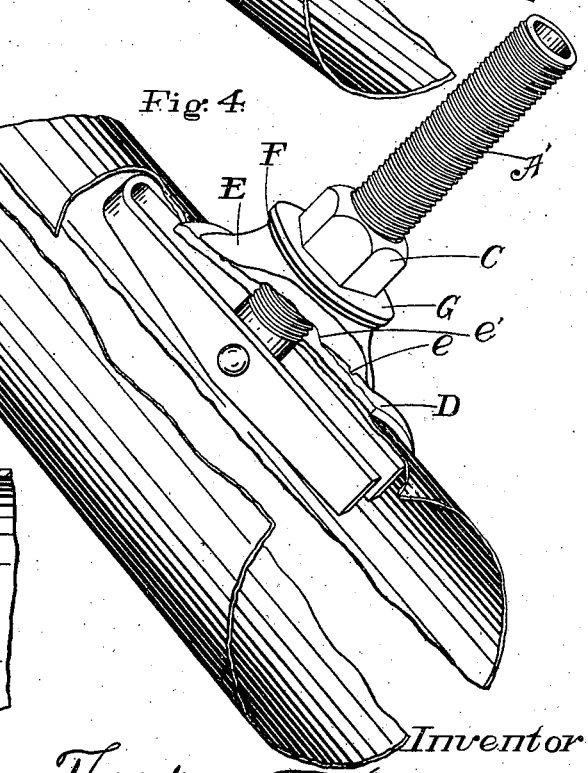
Witnesses
Perry Kingman.
Alfred L. Townsend.
Inventor
Theodore F. Long
by Hazard & Townsend
his attys.

UNITED STATES PATENT OFFICE.

THEODORE F. LONG, OF GARVANZA, CALIFORNIA.

PATCH FOR PRESSURE-PIPES.

SPECIFICATION forming part of Letters Patent No. 564,251, dated July 21, 1896.

Application filed October 4, 1895. Serial No. 564,609. (No model.)

*To all whom it may concern:*

Be it known that I, THEODORE F. LONG, a citizen of the United States, residing at Garvanza, in the county of Los Angeles and State of California, have invented a new and useful Improvement in Patches for Pressure-Pipes, of which the following is a specification.

My invention relates to that class of patches for stopping leaks in pipes for supplying water or gas after such pipes are in service, in which the patch is held by a fastener inserted into the pipe.

The object of my invention is to provide a simpler, less obstructive, stronger, more easily applied device of this class, and to also absolutely prevent any seepage through the patch.

The accompanying drawings illustrate my invention.

Figure 1 is a perspective view of my newly-invented patch-fastener with parts in position for insertion into a hole in a pipe, a fragment of which is shown. The gaskets and other parts of the patch are shown in dotted lines. Fig. 2 is a fragmental perspective view, partly in sections, showing the patch applied to the fastener, which is shown in place to secure the same in a pipe, a fragment of which is shown. Fig. 3 is a vertical section of the patch applied. Fig. 4 shows my patch applied with a service-pipe in making connection with a main.

My invention embraces a pipe-patch fastener comprising a stem formed of an eyebolt A, having an eye $a$, and a T-head B, composed of a journal $b$ and two arms 1 2, arranged at the opposite ends of the journal and projecting in opposite directions therefrom. The journal is journaled in the eye $a$ of the eyebolt.

One of the arms, 1, of the T-head is longer or is otherwise made heavier than the other arm, 2, of the T-head, and when the T-head is to be inserted through the hole which constitutes the leak in the pipe, the lighter arm is placed downward, so that when the T-head is fully inserted, the other arm will fall and raise the lighter arm and thus bring the T-head crosswise the hole.

The lighter arm of the T-head is pointed, so that it can be used to enlarge the hole which causes the leak, and thus make the opening large enough to allow the T-head to be forced in. The other arm is also preferably pointed, for the reason that the pointed arms will cause less obstruction in the pipe.

In practical use to apply a patch to a leak in a pipe, the operator swings the T-head to bring the longer arm alongside the bolt A, and then, if the hole in the pipe is not large enough, he places the pointed end of the other arm against the pipe at the leak, then with a hammer he will drive the bolt downward to cause the pointed arm of the T to force its way into the pipe and the bolt is then driven on until the eye of the bolt has passed through the hole; then the bolt is pushed on into the pipe until the weight of the heavier arm throws the T-head into horizontal position; then the nut C is screwed down and the bolt is drawn upward until the patch is secured in place.

In practical use the patch-gasket and its securing washers and nut will be in place when the bolt is applied to be driven into the pipe, so that as soon as the T-head is fully inside and brought into place, the nut can be screwed down and the work completed.

My invention includes, in addition to the new form of fastener for the patch, a new combination of parts to form the patch proper, and I will now describe the same.

To form my improvement, I provide a compressible gasket D, which is fitted upon the pipe P, and I provide a rigid gasket E, fitted upon the stem A or A' and against the compressible gasket and having its under face conformed to the pipe and provided with an annular bead $e$ around the stem-hole $e''$, and also provided with the countersink $e'$ at the stem-hole into which the upper bulge of the eye of the stem can seat; and I provide a compressible gasket F, arranged around the stem on top of the rigid gasket E, and provide a washer G, fitted upon such gasket, and a nut C, which screws down upon the washer and clamps all of the parts together. This combination absolutely prevents any seepage of water through the patch.

The annular bead $e$ causes a greater compression of the compressible gasket D where it comes in contact with such gasket and provides an absolute closure between the rigid gasket and the pipe. The compressible gasket which is fitted upon the top of the rigid gasket fits closely against the stem and when compressed by the washer and nut, prevents any seepage out along the threads of the stem.

In Figs. 1, 2, and 3, the patch is shown merely as a patch, and in those views a bolt is used, the stem of which is screw-threaded far enough to allow the nut to be screwed down to firmly clamp the parts together.

In Fig. 4 the patch is shown applied to close an opening made for connecting a service-pipe, and in this view the service-pipe forms the stem upon which the nut is screwed and upon which the T-head is pivoted. In this view the T-head is of a form different from that which forms the subject-matter of my present invention and constitutes a separate invention and is claimed in a separate application for patent, which was filed by me in the United States Patent Office June 17, 1895, Serial No. 553,173. The same consists of a bifurcated cross-head, the free ends of the bifurcations of which are heavier than the opposite end of the cross-head, so that the free ends can be brought parallel with the stem while being inserted and will then throw the T-head into place across the opening after the T-head has been fully inserted through the opening.

Now, having described my invention, what I claim as new, and desire to secure by Letters Patent, is—

1. The fastener for patches for pipes consisting of an eyebolt, and a T-head composed of a journal, journaled in the eye and two arms arranged at opposite ends of the journal and projecting in opposite directions therefrom.

2. The pipe-patch fastener consisting of an eyebolt, and a T-head comprising a journal arranged in the eye of the eyebolt and two arms fastened to the ends of the journal and projecting in opposite directions therefrom, one of such arms being pointed and lighter than the other substantially as and for the purpose set forth.

3. A pipe-patch comprising the combination of the screw-threaded stem; a T-head pivoted at one end thereof; a compressible gasket arranged around the stem and fitted upon the pipe; a rigid gasket arranged on such stem and having its under face conformed to the pipe and provided with an annular bead around such stem and fitted upon the compressible gasket; a compressible gasket arranged on such stem and seated on the rigid gasket; the washer fitted upon the compressible gasket; and the nut screwed upon the stem to hold the parts together.

4. In a pipe-patch, the combination set forth of the screw-threaded stem provided with the T-head pivoted to one end thereof; the compressible gasket arranged around the stem and fitted upon the pipe; the rigid gasket fitted upon the stem and having its under face seated upon the compressible gasket and conformed to the pipe and provided with the annular bead and with the countersunk portion around the stem; the compressible gasket fitted upon the rigid gasket; the washer fitted upon such compressible gasket; and the nut to draw the parts together.

THEODORE F. LONG.

Witnesses:
JAMES R. TOWNSEND,
ALFRED I. TOWNSEND.